US011604800B1

(12) United States Patent
Alubelli et al.

(10) Patent No.: US 11,604,800 B1
(45) Date of Patent: Mar. 14, 2023

(54) GENERATING A VISUALIZATION OF DATA POINTS RETURNED IN RESPONSE TO A QUERY BASED ON ATTRIBUTES OF A DISPLAY DEVICE AND DISPLAY SCREEN TO RENDER THE VISUALIZATION

(71) Applicant: INTERNATIONAL BUSINESS MACHINES CORPORATION, Armonk, NY (US)

(72) Inventors: Venkata Ratnam Alubelli, Vizag (IN); Saraswathi Sailaja Perumalla, Visakhapatnam (IN); Gowri Pruthvi, Hyderabad (IN); Pavan Kumar Penugonda, Anakapalle (IN); Akash U. Dhoot, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/387,996

(22) Filed: Jul. 28, 2021

(51) Int. Cl.
  *G06F 16/248* (2019.01)
  *G06F 16/957* (2019.01)
  *G06F 21/62* (2013.01)
  *G06F 16/9032* (2019.01)

(52) U.S. Cl.
  CPC ...... *G06F 16/248* (2019.01); *G06F 16/90332* (2019.01); *G06F 16/9577* (2019.01); *G06F 21/6218* (2013.01)

(58) Field of Classification Search
  CPC ............. G06F 16/248; G06F 16/90332; G06F 16/9577; G06F 21/6218
  See application file for complete search history.

(56) References Cited

U.S. PATENT DOCUMENTS

| 9,286,390 | B2 | 3/2016 | Marantz et al. | |
|---|---|---|---|---|
| 9,449,062 | B2 | 9/2016 | Latzina | |
| 2004/0128070 | A1* | 7/2004 | Schmidt | G06F 16/29 |
| | | | | 701/436 |
| 2006/0271887 | A1* | 11/2006 | Bier | G06F 16/9577 |
| | | | | 715/866 |

(Continued)

OTHER PUBLICATIONS

"Content Explorer", [Online][retrieved Jul. 11, 2021], p. 9, https://ahrefs.com/content-explorer.

(Continued)

*Primary Examiner* — Keith D Bloomquist
(74) *Attorney, Agent, or Firm* — Konrad Raynes Davda & Victor LLP; David W. Victor

(57) ABSTRACT

Provided are a computer program product, system, and method for generating a visualization of data points returned in response to a query based on attributes of a display device and display screen to render the visualization. A determination is made of inputs comprising area dimensions of the display screen and capabilities of the display device to render data points retrieved in response to a query. The inputs and the data points are provided to a visualization engine to output a type of visual presentation for the data points, a size of the visual presentation to render on the display screen, and a level of detail to aggregate the data points to render on the display screen. A visualization is generated to render on the display screen the data points in the type of visual presentation according to the size of the visual presentation and with the level of detail.

20 Claims, 6 Drawing Sheets

(56) References Cited

U.S. PATENT DOCUMENTS

| | | | |
|---|---|---|---|
| 2007/0226626 A1* | 9/2007 | Yap | G06F 16/958 |
| | | | 715/733 |
| 2007/0250768 A1* | 10/2007 | Funakami | G06F 16/9577 |
| | | | 715/761 |
| 2012/0256926 A1* | 10/2012 | Jimenez | G06T 11/206 |
| | | | 345/440 |
| 2013/0187926 A1* | 7/2013 | Silverstein | G06F 16/285 |
| | | | 345/440 |
| 2015/0135067 A1* | 5/2015 | Ellis | G06F 40/103 |
| | | | 715/273 |
| 2015/0379097 A1* | 12/2015 | Robertson | G06F 16/26 |
| | | | 707/725 |
| 2016/0188681 A1 | 6/2016 | Savliwala et al. | |
| 2017/0046404 A1* | 2/2017 | Shim | G06F 16/9535 |
| 2017/0185696 A1* | 6/2017 | Hawkes | G06Q 10/10 |
| 2019/0034498 A1 | 1/2019 | Das et al. | |

OTHER PUBLICATIONS

"DataWarehouse", IBM Corporation, [Online][retrieved Jul. 15, 2021], 2020, p. 4, https://www.ibm.com/docs/en/elm/7.0.0?topic=architecture-data-warehouse.

J. Hardwick, "Google Search Operators The Complete List 42 Advanced Operators", [Online][retrieved Jul. 11, 2021] Aug. 3, 2020, p. 91, https://ahrefs.com/blog/google-advanced-search-operators/ [Jul. 11, 2021 8:14:22 PM].

\* cited by examiner

GENERATING A VISUALIZATION OF DATA POINTS RETURNED IN RESPONSE TO A QUERY BASED ON ATTRIBUTES OF A DISPLAY DEVICE AND DISPLAY SCREEN TO RENDER THE VISUALIZATION

BACKGROUND OF THE INVENTION

1. Field of the Invention

The present invention relates to a computer program product, system, and method for generating a visualization of data points returned in response to a query based on attributes of a display device and display screen to render the visualization.

2. Description of the Related Art

People use Internet search engines to gather statistical and other numeric data to provide an answer to a question or query to support an argument or view. After the user receives from the Internet search engine the relevant data points on the numeric data that answers a question, such as numerical data about a disease spread or fatality, polling trends, financial data, etc., the user may then have to select the data to present and then import the data into a spreadsheet or other presentation program to generate visual representations of the data points.

The above process to allow users to produce graphical representations of numerical data to support a position or provide useful information may be very time consuming and require specialized programs to graph the data, as well as specialized skills to use the graphing features and programs to produce optimal presentations of the data.

There is a need in the art for improved techniques for gathering data points to answer a query and then automate the presentation of the data points into an optimal graphical presentation to render on a computer display screen.

SUMMARY

Provided are a computer program product, system, and method for generating a visualization of data points returned in response to a query based on attributes of a display device and display screen to render the visualization. Data points are retrieved in response to a query from a user. A determination is made of inputs comprising area dimensions of the display screen and capabilities of the display device to render the data points. The inputs and the data points are provided to a visualization engine to output a type of visual presentation for the data points, a size of the visual presentation to render on the display screen, and a level of detail to aggregate the data points to render on the display screen. A visualization is generated that when sent to the display device renders on the display screen the data points in the type of visual presentation according to the size of the visual presentation and with the level of detail to present. The visualization is transmitted to the display device to render on the display screen.

DETAILED DESCRIPTION

Described embodiments provide improvements to computer technology to automate and optimize a visual presentation of data points of numerical data that are returned to answer a query. Described embodiments gather, in response to Internet and enterprise search queries, data points and dimension data having attributes and information on the data points that are returned in response to a query for a quantity or number related to an occurring phenomena. Described embodiments provide to a visualization engine various inputs on capabilities and features of a display device and screen to render a graphical visualization of the data points. From these inputs, the visualization engine may determine output of optimal features for presenting the data points, such as a type of visual presentation for the data points, a size of the visual presentation to render on the display screen, and a level of detail to aggregate the data points in the visualization. In this way, described embodiments convert data points returned in response to a query for numerical information into a graphical presentation without requiring input or special knowledge from the user submitting the query on the optimal format to render the data points in a graphical presentation.

Figure 1:
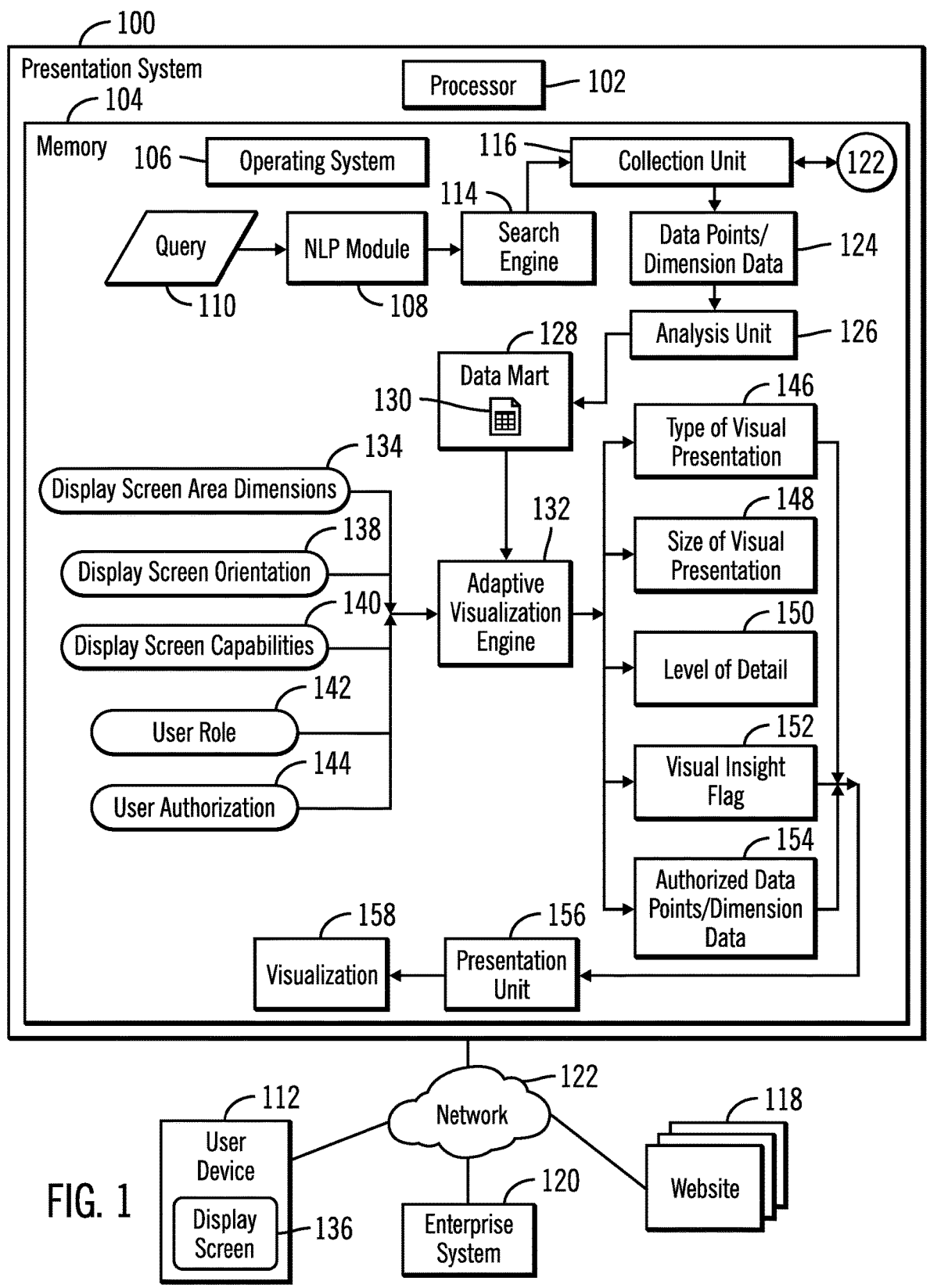
FIG. 1 illustrates an embodiment of a computing environment to render a visualization of data points returned in response to a query.

FIG. 1 illustrates an embodiment of a presentation system 100 in which embodiments are implemented. The presentation system 100 includes a processor 102 and a main memory 104. The main memory 104 includes various program components including an operating system 106; a natural language processor (NLP) module 108 to interpret and parse a query 110 from a user at a user device 112, also referred to as a display device; a search engine 114 to receive the processed query from the NLP module 108 and generate one or more formal queries, such as Structured Query Language (SQL) statements, to provide to a collection unit 116 which executes the queries to search Internet websites 118 or an enterprise system 120 over a network 122. The collection unit 116 gathers the retrieved data points and dimension data in response to the query 110, which may be a request for quantitative information or metrics to answer a question, and provides to an analysis unit 126. In one embodiment, the data points comprise numeric or measured data of a phenomena or occurrence and the dimension data comprises data attributes of the data points providing insights, attributes and explanations of the data points. The analysis unit 126 may index the retrieved data points and dimension data 124 into a data mart 128 in which the primary data points and dimension data may be implemented in a multidimensional model 130 of multidimensional views of the data.

An adaptive visualization module 132, which may be in the main memory 104 or implemented in separate hardware or memory device, receives as input the data points and dimensional data 130 and input information, including: display screen area dimensions 134 of a display screen 136 of the user submitting the query 110; display screen orientation 138, e.g., portrait, landscape, etc.; display screen capabilities 140, such as ability to display more complex and expanded data; a user role 142 of the user submitting the query 110 in the organization, e.g., management, vice president, technical, etc.; and user authorization 144 indicating authorization to access sensitive information in the enterprise system 120.

The adaptive visualization module 132 receives the inputs 130, 134, 138, 140, 142, and 144 and may use machine learning and artificial intelligence to output visualization parameters used to generate a visualization of the data points and dimension data, including a type of visual presentation 146, such as a pie chart, bar chart, line chart; a size of the visual presentation 148 to fit the display screen 136; a level of detail 150 indicating an extent to which the data points are aggregated into higher level units and abstractions, such as days, months, years, numbers of units, etc.; a visual insight flag 152 indicating whether dimensional data and text summaries of dimensional data may be rendered; and a set of authorized data points and dimensional data 154 the user is authorized to view.

This output 146, 148, 150, 152, 154 may be provided to a presentation unit 156 to use to generate a visualization 158 of the data points and dimension data if selected. The visualization 158 is transmitted to the user device 112 to render on the display screen 136.

In certain embodiments, the collection unit 116 may submit the queries to a web search engine, such as a publicly available web search engine, such as Google®, Bing®, etc. (Google is a registered trademark of Google LLC and Bing is a registered trademark of Microsoft Corporation), to search Internet Websites 118. The collection unit 116 may also include a proprietary or local search engine to search the enterprise system 120, such as enterprise databases, for information.

In certain embodiments, the data points may comprise numeric data and measurements, such as numerical measures, quantity, amount, etc. to answer the query 110 and the dimension data may comprise additional data related to an expanding upon the data points, such as providing perspective information, background information, and supplemental information associated with the data points. The data points and dimension data 124 may be stored in the multi-dimensional model 130, such as in the form of a star schema, data cube, etc. In alternative embodiments, the term "dimension data" may refer to any data in any data model or format providing attributes and related information associated with the data points that provides insights into the data points. In further embodiments, the data points and dimension data may be stored in data structures and formats other than a multi-dimensional model, such as extended markup language (XML) format.

In certain embodiments, the adaptive visualization engine 132 may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce the computed output. In backward propagation used to train a neural network machine learning module, biases at nodes in the hidden layer are adjusted accordingly to produce the output visualization parameters 146, 148, 150, 152 having specified confidence levels based on the input parameters 130, 138, 140, 142, 144. Backward propagation may comprise an algorithm for supervised learning of artificial neural networks using gradient descent. Given an artificial neural network and an error function, the method may calculate the gradient of the error function with respect to the neural network's weights and biases.

In backward propagation used to train a neural network machine learning module, such as the adaptive visualization engine 132, margin of errors are determined based on a difference of the calculated predictions and whether the object was located at the predicted location. This information on whether output parameters 146, 148, 150, and 152 provide an optimal visualization may be used to modify the confidence levels of different output visualization parameters 146, 148, 150, and 152 based on various inputs 130, 138, 140, 142, 144. Biases at nodes in the hidden layer are adjusted accordingly to decrease reduce the confidence levels for output parameters 146, 148, 150, and 152 that did not provide an optimal visualization of the data points and dimension data and increase the confidence levels for output parameters 146, 148, 150, 152 that did result in optimal visualizations.

In certain embodiments, the adaptive visualization engine 132 may be trained using sets of inputs 130, 138, 140, 142, 144 to produce assigned optimal output sets 146, 148, 150, 152, 154 for the input sets.

In an alternative embodiment, the adaptive visualization engine 132 may be implemented not as a machine learning module, but implemented using a rules based system to determine the outputs from the inputs.

The arrows shown in FIG. 1 between the components and objects in the memory 104 represent a data flow between the components.

Generally, program modules, such as the program components 106, 108, 114, 116, 126, 132, 156 may comprise routines, programs, objects, components, logic, data structures, and so on that perform particular tasks or implement particular abstract data types. The program components and hardware devices of the presentation system 100 of FIG. 1 may be implemented in one or more computer systems, where if they are implemented in multiple computer systems, then the computer systems may communicate over a network.

The program components 106, 108, 114, 116, 126, 132, 156 may be accessed by the processor 102 from the memory 104 to execute. Alternatively, some or all of the program components 106, 108, 114, 116, 126, 132, 156 may be implemented in separate hardware devices, such as Application Specific Integrated Circuit (ASIC) hardware devices.

The functions described as performed by the programs 106, 108, 114, 116, 126, 132, 156 may be implemented as program code in fewer program modules than shown or implemented as program code throughout a greater number of program modules than shown.

The network 122 may comprise one or more of a Storage Area Network (SAN), Local Area Network (LAN), Intranet, the Internet, Wide Area Network (WAN), peer-to-peer network, wireless network, arbitrated loop network, etc.

The term "user" as used herein may refer to a person or computer process that submits a query 110 for presentation on the user device 112.

The user device 112 may comprise a smart phone, smart watch, personal digital assistance (PDA), or stationary computing device having a display screen 136 to render the visualization 158. The presentation system 100 may be implemented within the user device 112 or in a separate computing device as shown in FIG. 1.

The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

Figure 2:
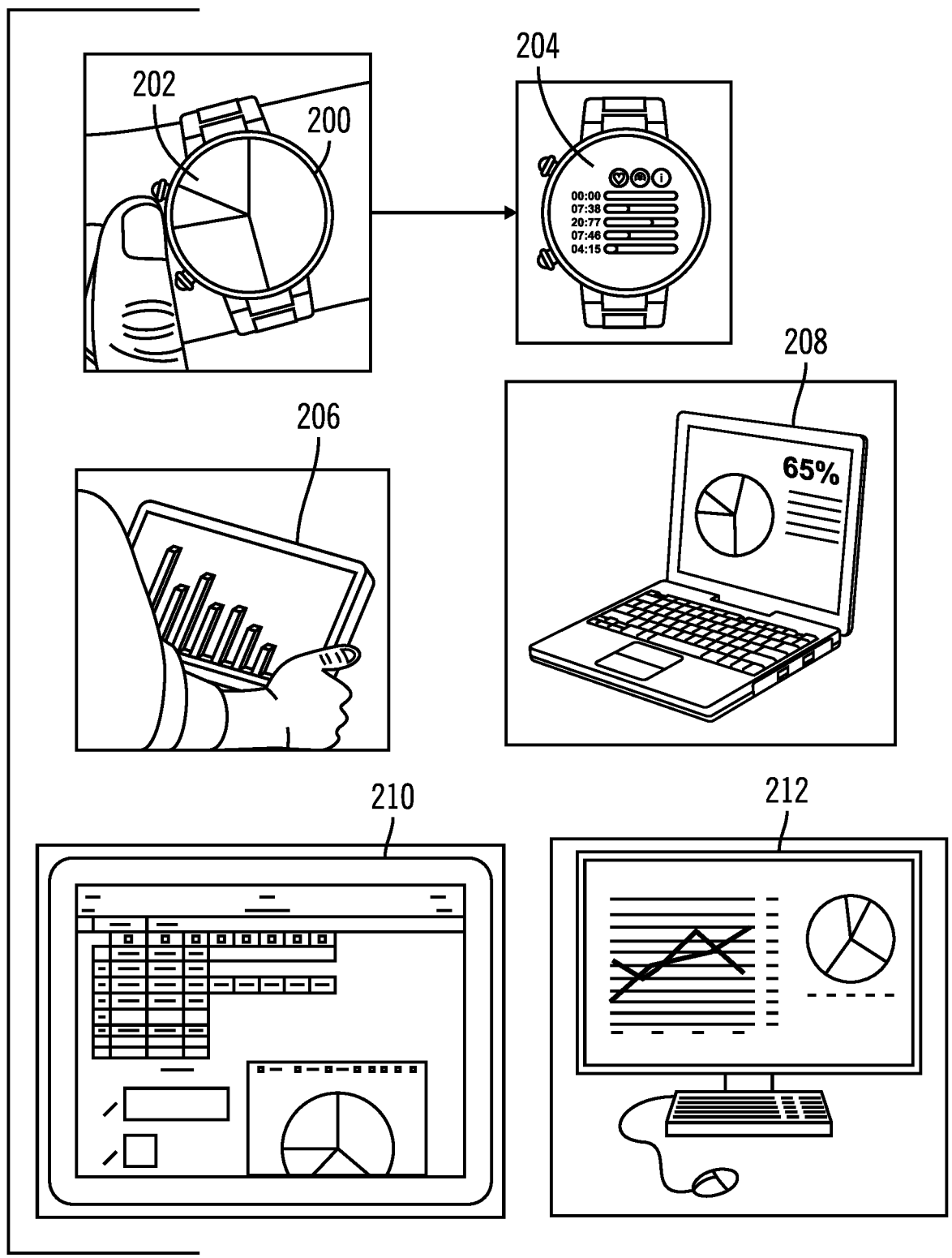
FIG. 2 illustrates an example of how data points may be rendered for different display screens.

FIG. 2 illustrates examples of visualizations of data points and dimensions on different display screens. For instance, smart watch 200 shows a visualization 202 of a pie chart of the data points, and selection of one of the slices of the chart would generate dimension data 204 related to the data points in the selected slice showing further attributes or details of the data points represented in the selected slice in the visualization 202. Tablet 206 shows a bar chart rendered in a landscape orientation. Laptop 208 and larger screens 210, 212 illustrate how the data points and additional dimensions data beyond just a pie chart may be shown due to the large screen.

Figure 3:
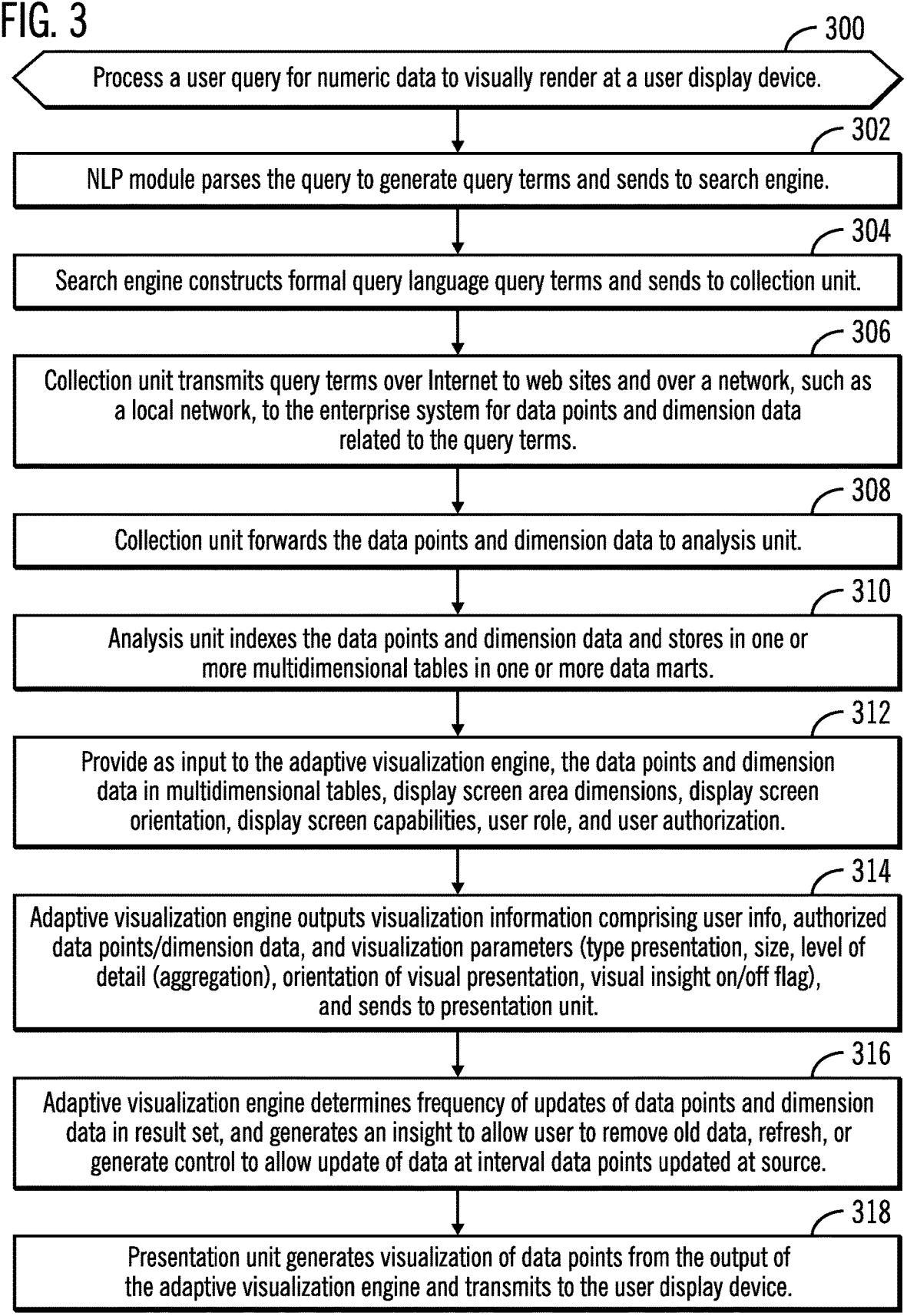
FIG. 3 illustrates an embodiment of operations to process a user query to generate a visualization of data points returned in response to the query to render on a display screen.

FIG. 3 illustrates an embodiment of operations performed by the components of the presentation system 100 to process a user query 110. The query 110 may involve a question for numeric data that may be visually presented in a graph or chart, such as a question concerning a trend in the population, polling results, marketing and sales data, disease spread, adoption of items or views, etc. Upon receiving (at block 300) the query 110, which may comprise a natural language statement received as written text or audio, the NLP module 108 parses (at block 302) the query 110 to generate query terms and sends to the search engine 114. The search engine 114 constructs (at block 304) formal query language terms, e.g., Structured Query Language (SQL) terms, and sends to the collection unit 116. The collection unit 116 transmits (at block 306) the query terms over the Internet 122 to web sites 118, which may be sent through an Internet search engine, and over a network 122, such as a local area network (LAN) or storage area network (SAN), to the enterprise system 120 to retrieve data points and dimension data related to the query terms. The collection unit 116 may only gather from the enterprise system 120 data points and dimension data 124 the user is authorized to access. Alternatively, another component, such as the adaptive visualization engine 132 may redact data points and dimensions data the user does not have authorization to access, resulting in authorized data points and dimension data 154. The collection unit 116 forwards (at block 308) the authorized data points and dimension data 154 to the analysis unit 126 to process.

The analysis unit 126 indexes (at block 310) the data points and dimension data 124, and forms data marts 128, such as multidimensional tables 130, to store the data points and dimension data 154 satisfying the query. The multidimensional tables 130, display screen area dimensions 134, display screen orientation 138, display screen capabilities 140, user role 142, and user authorization 144 are provided as input (at block 312) to the adaptive visualization engine 132. The adaptive visualization engine 132 processes (at block 314) the inputs 130, 138, 140, 142, 144 and outputs visualization parameters comprising user information, authorized data points/dimensions 154 and visualization information comprising type of visual presentation 146, size 148, level of detail 150 (aggregation), orientation of visual presentation, visual insight on/off flag 152, and sends this output to the presentation unit 156. The adaptive visualization engine 132 may determine a frequency of updates of data points and dimension data in result set, and generates an insight to allow user to remove old data, refresh, or generate control to allow update of data at interval data points updated at source. The presentation unit 156 generates (at block 318) a visualization 158 of data points from the output visualization information 400 from the adaptive visualization engine 132 and transmits to the user display device 112 to render on the display screen 136. The visualization 158 may comprise files in a format that the user device 112 can process and render on the display screen 136.

The adaptive visualization engine 132 may be trained to output optimal visualizations 146, 148, 150, 152 for different types of data points with a highest confidence level in the following manner:

(1) if the user device 112 is a smart watch and of round size, then the adaptive visualization engine 132 may generate a Pie Chart to conform to the shape of the display screen 136.

(2) If the user device 112 is a smart watch and of square size then the adaptive visualization engine 132 may generate the Bar Chart or Line Chart to conform to the shape of the display screen 136.

(3) If the user device 112 has holographic capability, then the adaptive visualization engine 132 may generate a three-dimensional view to render the visualization 158.

(4) Based on the type of requested information, the adaptive visualization engine 132 may output type of graphical charts that are most suited to visualize the requested information. For instance, if the user has submitted a query 110—"what are statewide COVID cases", then adaptive visualization engine 132 may generate a pie chart or bar chart as per user device 112 capability. However, if the query 110 is "what is trend of COVID spreading in state", then the adaptive visualization engine 132 may generate a trend chart.

(5) The adaptive visualization engine 132 based on display screen capabilities 140 may determine how much abstract or detailed data points to display. For instance, for larger screen dimensions 134 and capabilities, the level of detail 148 may comprise data points aggregated in months to display, whereas for smaller screen dimensions 134, data points aggregated in years may be displayed.

(6) The adaptive visualization engine 132 based on the user role 142 in the enterprise and based on the display screen capabilities 140 may generate a type of visual presentation 146 that does not maximize use of the user device capabilities 140. For instance, if the user is a senior executive of the enterprise and the query 110 involves revenue per geographical location, and the device capability 140 and screen dimensions 134 are robust, such as for a tablet or laptop computer having ample space to show detailed information, the adaptive visualization engine 132 may nonetheless generate a less detailed and involved view, such as a pie chart, because high level executives may require a higher level view of information. The user can then go into an interactive mode to dive deeper to a lower level of detail of data points or view dimension data having attributes on the selected data points.

Figure 4:
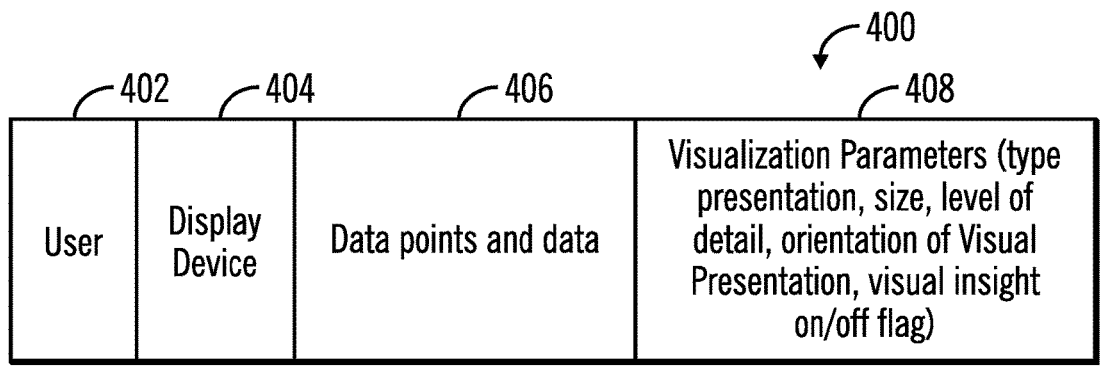
FIG. 4 illustrates an embodiment of visualization information generated to use to create the visualization of the data points returned in response to the query.

FIG. 4 illustrates an embodiment of visualization information 400 the adaptive visualization engine 132 provides to the presentation unit 156 to use to generate visualizations 158 for the user device 112, including a user identifier 402; the display device 404, such as type, location, etc.; the data points and dimension 406; and visualization parameters 408 including type of visual presentation 146, size 148, level of detail 150, orientation of visual presentation, and visual insight 152 on/off flag indicating whether user can expand to other dimensions on data points.

Figure 5:
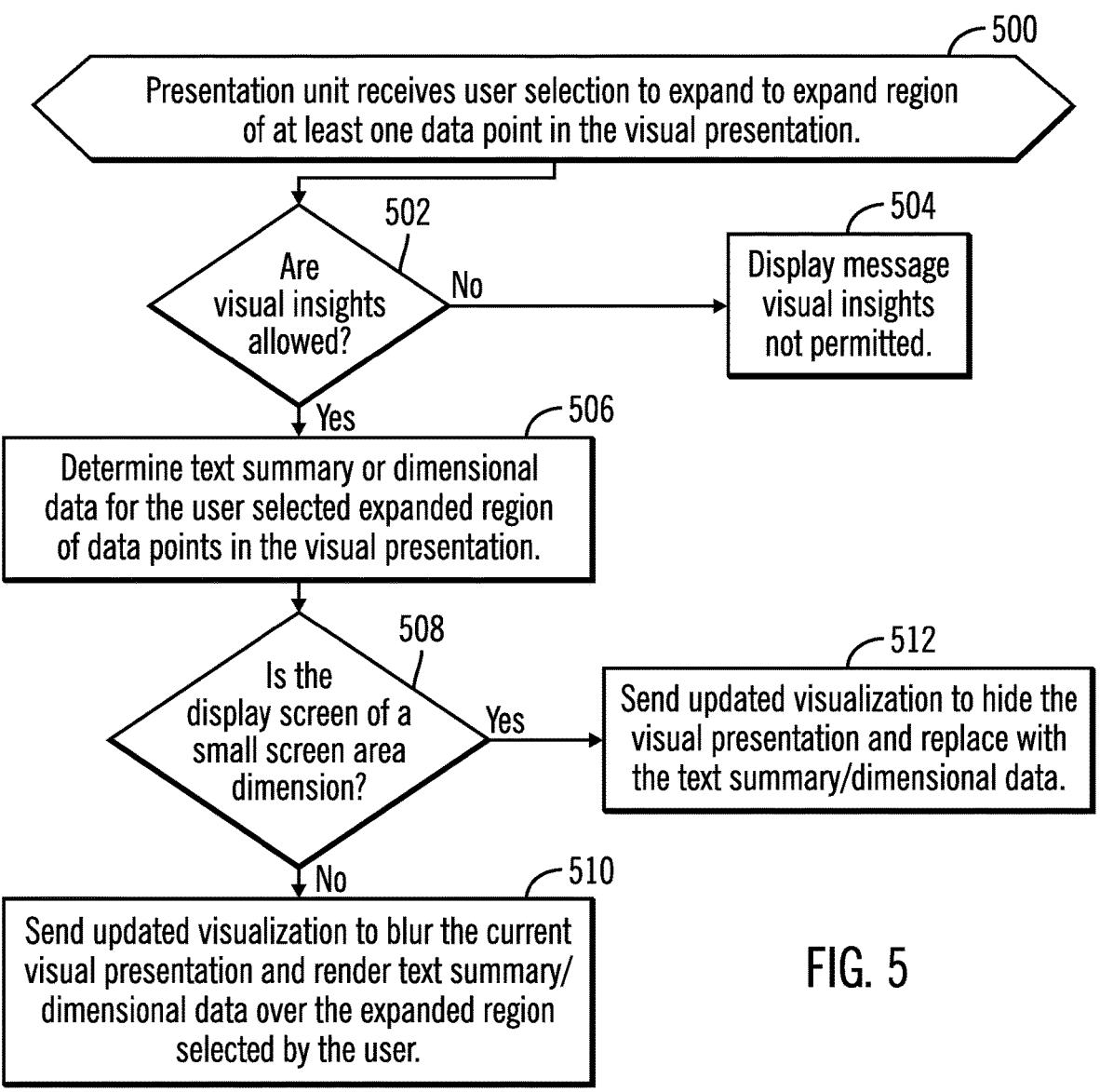
FIG. 5 illustrates an embodiment of operations to expand the visualization of the data points to render dimension data on the data points in the display screen.

FIG. 5 illustrates an embodiment of operations performed by the presentation unit 156, or other component, to process a user request to expand a region of data points in the visualization 158 rendered on the display screen 136. Upon receiving (at block 500) a user request to expand a region of at least one data point in the presentation of the visualization 158 in the display screen 136, if (at block 502) the visual insight flat 152 indicates visual insights are not allowed or off, then the presentation unit 156 generates (at block 504) a visualization 158 to display a message that visual insights not permitted. If (at block 502) the visualization flag 152 indicates visual insights are allowed or on, then the presentation unit 156 determines (at block 506) a text summary or dimensional data for the user selected expanded region of data points in the visual presentation.

If (at block 508) the display screen is of a relatively large area dimension, e.g., tablet, laptop, desktop display, then the presentation unit 156 sends (at block 510) an updated visualization 158 to blur the current visual presentation and render the determined text summary/dimensional data over the expanded region selected by the user in the display screen 136. Otherwise, if (at block 508) the display screen is of a small area dimension, such as a smart watch, then the presentation unit 156 sends (at block 512) an updated visualization 158 to hide the visual presentation and replace with the text summary/dimensional data.

With the embodiment of FIG. 5, the presentation unit 156 renders visual insights, such as text summaries or dimensional data in a manner that exploits to the full extent the device capabilities. For instance, for devices having greater capabilities, more advanced graphical effects may be used, such as blurring the background visualization of the data points to superimpose the dimensional data or for smaller area dimension displays, such as a smart watch, displaying the text summary of the dimension data only on the display screen 136.

Figure 6:
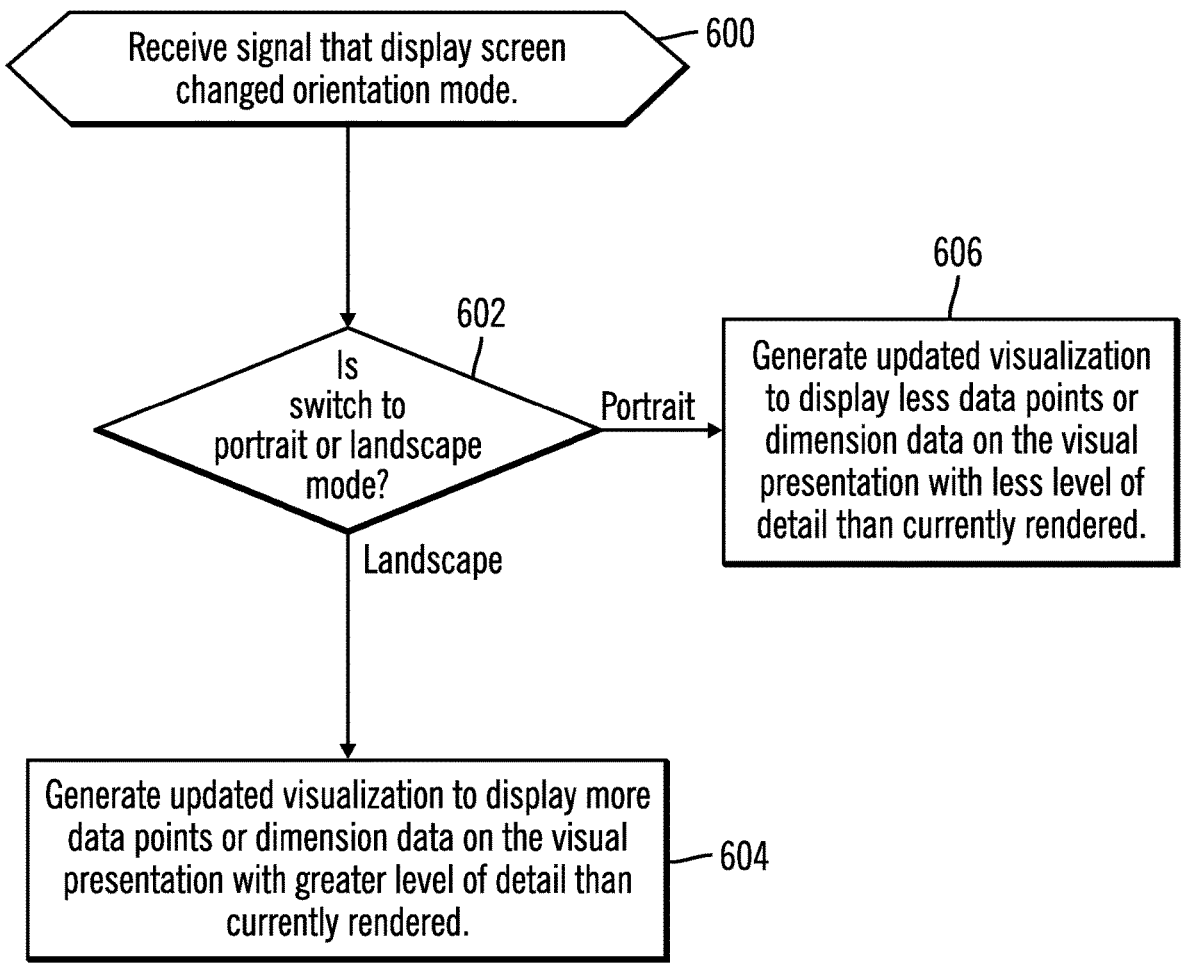
FIG. 6 illustrates an embodiment of operation to modify the visualization of the data points in response to a change in orientation of the display screen.

FIG. 6 illustrates an embodiment of operations performed by the presentation unit 156, or other component, to modify the visualization 158 upon detecting a change in the orientation of the display screen 136, such as a change between portrait and landscape mode. Upon receiving (at block 600) from the user device 112 a signal the display screen 136 changed orientation mode, if (at block 602) the switch was to landscape mode, then the presentation unit 156 generates (at block 604) an updated visualization 158 to display more data points or dimension data on the visual presentation with greater level of detail than currently rendered. If (at block 602) the orientation has changed from landscape to portrait mode, then the presentation unit 156 generates (at block 606) an updated visualization 158 to display less data points or dimension data on the visual presentation with lower level of detail than currently rendered.

With the embodiment of FIG. 6, the presentation unit 156 optimizes the rendering of data points or other data based on the display screen 136 orientation to take advantage of additional space to render data should the orientation change from portrait to landscape.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
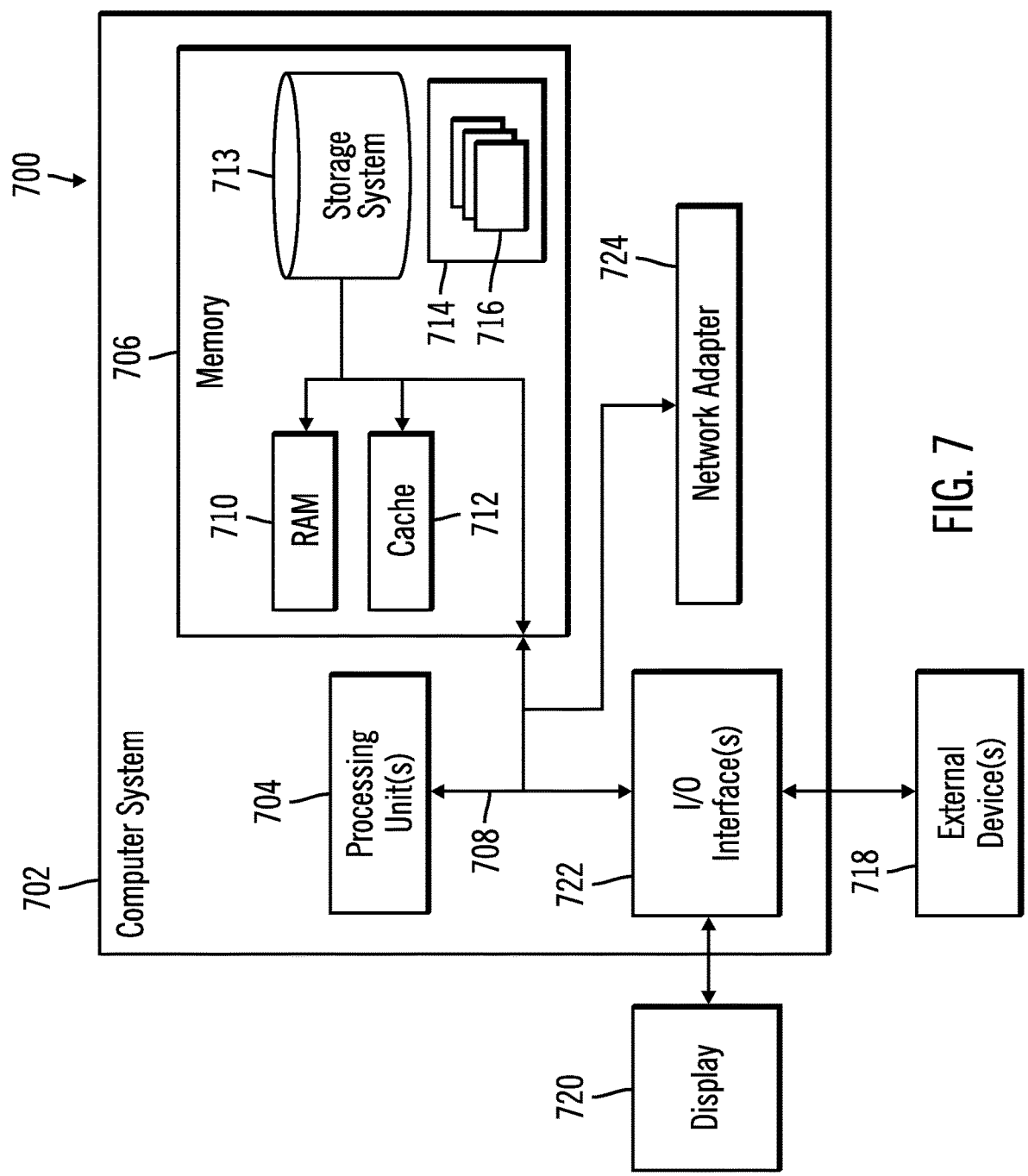
FIG. 7 illustrates a computing environment in which the components of FIG. 1 may be implemented.

The computational components of FIG. 1, including the presentation system 100, user device 112, enterprise system 120, and websites 118 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating a visualization of data points to render on a display screen of a display device, wherein the computer program product comprises a computer readable storage medium having program instructions embodied therewith that when executed cause operations, the operations comprising:
   providing training inputs, comprising training data points, area dimensions of a training display screen, and capabilities of the training display screen to render the training data points and training output visualizations of the training data points, comprising a type of visual presentation for the training data points, a training size of the visual presentation to render on the training display screen, and a training level of detail to aggregate the training data points into a higher level unit of a plurality of higher level units, wherein the higher level units provide different aggregations of the training data points to render on the training display screen;
   training a visualization engine, implementing machine learning, with the training inputs to produce the training output visualizations with an increased confidence level in response to the training output visualizations providing an optimal visualization of the training data points;
   training the visualization engine with the training inputs to produce the training output visualizations with a decreased confidence level in response to the training output visualizations providing less than an optimal visualization of the training data points;
   retrieving query data points in response to a query from a user;
   determining user inputs comprising area dimensions of a user display screen and capabilities of the user display screen to render the query data points;
   providing the user inputs and the query data points to the visualization engine to output a type of visual presentation for the query data points, a size of the visual presentation to render on the user display screen, and a level of detail to aggregate the query data points into a higher level unit of a plurality of higher level units;
   generating a visualization that when sent to the user display screen renders on the user display screen the query data points in the type of visual presentation for the query data points according to the size of the visual presentation to render on the user display screen and with the level of detail to aggregate the query data points into the higher level unit to present; and
   transmitting the visualization to render on the user display screen.

2. The computer program product of claim 1, wherein the visualization engine processes the user inputs to indicate whether dimension data providing attributes of the query data points can be rendered on the user display screen in response to user action to expand at least one query data point rendered in the visualization to present additional information on the expanded at least one query data point, wherein the operations further comprise:

in response to the user action to expand the at least one query data point rendered in the visualization, determining whether the visualization engine indicates whether dimension data can be rendered;

determining dimension data for the expanded at least one query data point in response to determining that the visualization engine indicates that dimension data can be rendered; and transmitting the determined dimension data to the user display screen to render on the user display screen.

3. The computer program product of claim 2, wherein the operations further comprise:

determining an authorization level of the user, wherein the query data points and the dimension data to render on the user display screen comprises the query data points and the dimension data the authorization level permits the user to access.

4. The computer program product of claim 2, wherein the operations further comprise:

generating a textual summary of the dimension data for the query data points; and providing, by the visualization engine, a first type of representation of the textual summary for a first area dimension of the user display screen and a second type of representation of the textual summary for a second area dimension of the user display screen, wherein the first type of representation renders the textual summary to replace the rendered visualization of the query data points on the user display screen, and wherein the second type of representation renders the textual summary superimposed over a portion of the query data points rendered in the visualization, wherein the second area dimension is greater than the first area dimension.

5. The computer program product of claim 1, wherein the visualization engine outputs one of: a pie chart as the type of visual presentation in response to area dimensions of the user display screen indicating a round shape of the user display screen; a bar chart or line chart as the type of visual presentation in response to the area dimensions of the user display screen indicating a square shape of the user display screen; and a three dimensional view as the type of visual presentation in response to the user display screen having holographic capability.

6. The computer program product of claim 1, wherein the visualization engine aggregates a first number of the query data points for a first higher level unit for a first area dimension of the user display screen and aggregates a second number of the query data points for a second higher level unit for a second area dimension, wherein the first area dimension is greater than the second area dimension, and wherein the first number of the query data points aggregated is less than the second number of the query data points aggregated.

7. The computer program product of claim 1, wherein the operations further comprise:

providing a role of the user to the visualization engine; and determining a first type of visual presentation associated with the role in which to render the query data points, wherein area dimensions of the user display screen permits a second type of visual presentation that provides a greater level of detail than the first type of visual presentation associated with the role, wherein the visualization renders the first type of visual presentation even though the area dimensions of the user display screen supports the second type of visual presentation.

8. The computer program product of claim 1, wherein the operations further comprise:

providing to the visualization engine an orientation of the user display screen, wherein the level of detail in which the query data points are rendered comprises a first level of detail for a portrait orientation of the user display screen and a second level of detail for a landscape orientation of the user display screen, wherein the second level of detail is greater than the first level of detail.

9. The computer program product of claim 1, wherein the operations further comprise:

determining a frequency of updates of the query data points, wherein the visualization generates insights for the user to include or not include query data points in the type of visual presentation based on the frequency of updates of the query data points.

10. The computer program product of claim 1, wherein the operations further comprise:

determining an update interval at a data source from which a subset of the query data points was retrieved; and rendering in the visualization a graphical element to enable the user to select to cause the visualization engine to update the query data points at the update interval.

11. A system for generating a visualization of data points, comprising:

a display device having a display screen;

a processor; and a computer readable storage medium having program instructions embodied therewith that is executed by the processor to cause operations, the operations comprising:

providing training inputs, comprising training data points, area dimensions of a training display screen, and capabilities of the training display screen to render the training data points and training output visualizations of the training data points, comprising a type of visual presentation for the training data points, a training size of the visual presentation to render on the training display screen, and a training level of detail to aggregate the training data points into a higher level unit of a plurality of higher level units, wherein the higher level units provide different aggregations of the training data points to render on the training display screen;

training a visualization engine, implementing machine learning, with the training inputs to produce the training output visualizations with an increased confidence level in response to the training output visualizations providing an optimal visualization of the training data points;

training the visualization engine with the training inputs to produce the training output visualizations with a decreased confidence level in response to the training output visualizations providing less than an optimal visualization of the training data points;

retrieving query data points in response to a query from a user;

determining user inputs comprising area dimensions of a user display screen and capabilities of the user display screen to render the query data points;

providing the user inputs and the data points to the visualization engine to output a type of visual presentation for the query data points, a size of the visual presentation to render on the user display screen, and a level of detail to aggregate the query data points into a higher level unit of a plurality of higher level units;

generating a visualization that when sent to the user display screen renders on the user display screen the query data points in the type of visual presentation for the query data points according to the size of the visual presentation to render on the user display screen and with the level of detail to aggregate the query data points into the higher level unit to present; and transmitting the visualization to render on the user display screen.

12. The system of claim 11, wherein the visualization engine processes the user inputs to indicate whether dimension data providing attributes of the query data points can be rendered on the user display screen in response to user action to expand at least one query data point rendered in the visualization to present additional information on the expanded at least one query data point, wherein the operations further comprise:

in response to the user action to expand the at least one query data point rendered in the visualization, determining whether the visualization engine indicates whether dimension data can be rendered;

determining dimension data for the expanded at least one query data point in response to determining that the visualization engine indicates that dimension data can be rendered; and transmitting the determined dimension data to the user display screen to render on the user display screen.

13. The system of claim 11, wherein the visualization engine aggregates a first number of the query data points for a first higher level unit for a first area dimension of the user display screen and aggregates a second number of the query data points for a second higher level unit for a second area dimension, wherein the first area dimension is greater than the second area dimension, and wherein the first number of the query data points aggregated is less than the second number of the query data points aggregated.

14. The system of claim 11, wherein the operations further comprise:

providing a role of the user to the visualization engine; and determining a first type of visual presentation associated with the role in which to render the query data points, wherein area dimensions of the user display screen permits a second type of visual presentation that provides a greater level of detail than the first type of visual presentation associated with the role, wherein the visualization renders the first type of visual presentation even though the area dimensions of the user display screen supports the second type of visual presentation.

15. The system of claim 11, wherein the operations further comprise:

providing to the visualization engine an orientation of the user display screen, wherein the level of detail in which the query data points are rendered comprises a first level of detail for a portrait orientation of the user display screen and a second level of detail for a landscape orientation of the user display screen, wherein the second level of detail is greater than the first level of detail.

16. A method for generating a visualization of data points to render on a display screen of a display device, comprising:

providing training inputs, comprising training data points, area dimensions of a training display screen, and capabilities of the training display screen to render the training data points and training output visualizations of the training data points, comprising a type of visual presentation for the training data points, a training size of the visual presentation to render on the training display screen, and a training level of detail to aggregate the training data points into a higher level unit of a plurality of higher level units, wherein the higher level units provide different aggregations of the training data points to render on the training display screen;

training a visualization engine, implementing machine learning, with the training inputs to produce the training output visualizations with an increased confidence level in response to the training output visualizations providing an optimal visualization of the training data points;

training the visualization engine with the training inputs to produce the training output visualizations with a decreased confidence level in response to the training output visualizations providing less than an optimal visualization of the training data points;

retrieving query data points in response to a query from a user;

determining user inputs comprising area dimensions of a user display screen and capabilities of the user display screen to render the query data points;

providing the user inputs and the query data points to the visualization engine to output a type of visual presentation for the query data points, a size of the visual presentation to render on the user display screen, and a level of detail to aggregate the query data points into a higher level unit of a plurality of higher level units;

generating a visualization that when sent to the user display screen renders on the user display screen the query data points in the type of visual presentation according to the size of the visual presentation and with the level of detail to aggregate the query data points into the higher level unit to present; and transmitting the visualization to render on the user display screen.

17. The method of claim 16, wherein the visualization engine processes the user inputs to indicate whether dimension data providing attributes of the query data points can be rendered on the user display screen in response to user action to expand at least one query data point rendered in the visualization to present additional information on the expanded at least one query data point, further comprising:

in response to the user action to expand the at least one query data point rendered in the visualization, determining whether the visualization engine indicates whether dimension data can be rendered;

determining dimension data for the expanded at least one query data point in response to determining that the visualization engine indicates that dimension data can be rendered; and transmitting the determined dimension data to the user display screen to render on the user display screen.

18. The method of claim 16, wherein the visualization engine aggregates a first number of the query data points for a first higher level unit for a first area dimension of the user display screen and aggregates a second number of the query data points for a second higher level unit for a second area dimension, wherein the first area dimension is greater than the second area dimension, and wherein the first number of the query data points aggregated is less than the second number of the query data points aggregated.

19. The method of claim 16, further comprising:
providing a role of the user to the visualization engine; and
determining a first type of visual presentation associated with the role in which to render the query data points, wherein area dimensions of the user display screen permits a second type of visual presentation that provides a greater level of detail than the first type of visual presentation associated with the role, wherein the visualization renders the first type of visual presentation even though the area dimensions of the user display screen supports the second type of visual presentation.

20. The method of claim 16, further comprising:
providing to the visualization engine an orientation of the user display screen, wherein the level of detail in which the query data points are rendered comprises a first level of detail for a portrait orientation of the display screen and a second level of detail for a landscape orientation of the user display screen, wherein the second level of detail is greater than the first level of detail.

\* \* \* \* \*